United States Patent [19]

Weichmann et al.

[11] Patent Number: 5,071,945
[45] Date of Patent: Dec. 10, 1991

[54] PROCESS FOR THE PRODUCTION OF SULPHONIC ACID GROUP-CONTAINING CONDENSATION PRODUCTS WITH A LOW CONTENT OF FREE FORMALDEHYDE

[75] Inventors: Josef Weichmann, Pleiskirchen; Manfred Bichler, Engelsberg; Alfred Kern, Kirchweidach; Hans-Günter Rosenbauer, Trostberg, all of Fed. Rep. of Germany

[73] Assignee: SKW Trostberg Aktiengesellschaft, Trostberg, Japan

[21] Appl. No.: 561,353

[22] Filed: Aug. 1, 1990

Related U.S. Application Data

[63] Continuation of Ser. No. 320,153, Mar. 7, 1989, abandoned.

[30] Foreign Application Priority Data

Mar. 25, 1988 [DE] Fed. Rep. of Germany ....... 3810114

[51] Int. Cl.[5] .................... C08G 12/40; C08G 12/30; C04B 24/22
[52] U.S. Cl. .................................. 528/254; 528/239; 528/255; 528/258; 528/265; 524/598
[58] Field of Search .................. 528/254, 258

[56] References Cited

U.S. PATENT DOCUMENTS

| 2,412,855 | 12/1946 | Auten et al. | 528/254 |
|---|---|---|---|
| 2,603,623 | 6/1948 | Bonzagni | 528/254 |
| 2,730,497 | 1/1956 | Suen et al. | 528/254 |
| 2,730,516 | 1/1956 | Suen et al. | 528/254 |
| 2,863,842 | 12/1958 | Bonzagni | 528/254 |
| 2,870,041 | 6/1958 | Waddle et al. | 528/254 |
| 2,949,396 | 8/1960 | Bonzagni | 528/254 |
| 3,661,829 | 5/1972 | Aignesberger et al. | 528/254 |
| 3,870,671 | 3/1975 | Aignesberger et al. | 528/254 |
| 3,941,734 | 3/1976 | Aignesberger et al. | 528/254 |
| 3,985,696 | 10/1976 | Aignesberger et al. | 528/254 |
| 4,224,423 | 9/1980 | Ogden et al. | 525/515 |
| 4,430,469 | 2/1984 | Bürge et al. | 524/247 |
| 4,444,945 | 4/1984 | Sheldrick | 528/254 |
| 4,501,839 | 2/1985 | Bürge et al. | 524/247 |
| 4,663,387 | 5/1987 | Lahalih et al. | 528/254 |
| 4,677,159 | 3/1987 | Lahalih et al. | 528/254 |
| 4,772,641 | 9/1988 | Meltz et al. | 528/254 |
| 4,820,766 | 4/1989 | Lahalih et al. | 528/254 |

FOREIGN PATENT DOCUMENTS

| 0248098 | 12/1987 | European Pat. Off. . |
| 1745441 | 1/1975 | Fed. Rep. of Germany . |
| 3605124 | 8/1987 | Fed. Rep. of Germany . |
| 782022 | 4/1978 | South Africa . |
| 782022 | 4/1978 | South Africa . |
| 1169582 | 11/1969 | United Kingdom . |

OTHER PUBLICATIONS

Makromolekulare Chemie, vol. 71, No. 1134, Aug. 1978, pp. 221 to 226.
Berichte Der Deutschen Chemischen Gesellschaft, Fol. 64, 1931, pp. 398 to 405.

Primary Examiner—John Kight, III
Assistant Examiner—Frederick Krass
Attorney, Agent, or Firm—Felfe & Lynch

[57] ABSTRACT

A process for the production of sulphonic acid group-containing condensation products based on amino-s-triazines with at least two amino groups and formaldehyde with a low content of free formaldehyde, wherein
 a) an amino-s-triazine, formaldehyde and sulphite is condensed in a mole ratio of 1:1.3 to 6:0.3 to 1.5 in aqueous solution at a pH value of 9.0 to 12.0 and at a temperature of 50° to 90° C. until sulphite is no longer detectable.
 b) subsequently, further condensation is carried out at a pH value of 2.0 to 7.0 and at a temperature of 50° to 90° C. until the viscosity of the solution is 4 to 1000 mm²/s at 80° C. and
 c) thereafter the condensation product is subjected to an after-treatment in a strongly alkaline range of pH$\sqrt{}$11.0 and at an elevated temperature.

10 Claims, No Drawings

5,071,945

PROCESS FOR THE PRODUCTION OF SULPHONIC ACID GROUP-CONTAINING CONDENSATION PRODUCTS WITH A LOW CONTENT OF FREE FORMALDEHYDE

This application is a continuation, of application Ser. No. 320,153, filed Mar. 7, 1989, now abandoned.

FIELD OF THE INVENTION

The present invention is concerned with a process for the production of sulphonic acid group-containing condensation products based on amino-s-triazines with at least two amino groups and formaldehyde, said condensation products having a low content of free formaldehyde.

BACKGROUND OF THE INVENTION AND THE PRIOR ART

From Federal Republic of Germany Patent Specification No. 16 71 017, it is known to produce building materials with the addition of a resin based on an amino-s-triazine with at least two $NH_2$ groups modified with sulphite or sulphonic acid. The sulphonic acid-modified melamine or guanamine resins thereby used can only be produced with a solids content of up to about 20% by weight and have a relatively high content of free formaldehyde.

Condensation products of this type with a high solids content of up to 50% by weight can be produced according to the processes described in South African Patent Specification No. 78/2022, as well as in Federal Republic of Germany Patent Specification No. 23 59 291 but the content of free formaldehyde of these melamine-formaldehyde condensation products remains unchangedly high.

This applies to the condensation products which, according to Federal Republic of Germany Patent Specification No. 25 05 587, also have an additional content of urea, as well as to the products according to Federal Republic of Germany Patent Specification No. 31 07 852 for the production of which there are also used relatively expensive amino and carboxylic acids in order to adjust the necessary pH value. The latter appears to be problematical, especially from the economic point of view.

In principle, it is, naturally, possible to reduce the content of free formaldehyde of these resins by the subsequent addition of a formaldehyde receiver, for example one based on urea or a urea derivative. However, in this way, foreign materials get into the condensation product, which is undesirable for many fields of use because the quality of the product can thereby be negatively influenced. Furthermore, this subsequent treatment represents an additional treatment step which requires additional operational and investment costs and is, therefore, economically problematical.

OBJECT OF THE INVENTION

Therefore, it is an object of the present invention to provide a process for the production of sulphonic acid group-containing condensation products based on amino-s-triazines with at least two amino groups and formaldehyde with a low content of free formaldehyde which do not display the disadvantages of the prior art but rather, with a low technical expense and without the help of foreign materials, makes possible an effective suppression of the formation of free formaldehyde.

DESCRIPTION OF THE INVENTION

Thus, according to the present invention, there is provided a process for the production of sulphonic acid group-containing condensation products based on amino-s-triazines with at least two amino groups and formaldehyde with a low content of free formaldehyde, wherein a) an amino-s-triazine, formaldehyde and sulphite is condensed in a mole ratio of 1:1.3 to 6:0.3 to 1.5 in aqueous solution at a pH value of 9.0 to 12.0 and at a temperature of 50° to 90° C. until sulphite is no longer detectable, b) subsequently, further condensation is carried out at a pH value of 2.0 to 7.0 and at a temperature of 50° to 90° C. until the viscosity of the solution is 4 to 1000 $mm^2/s$ at 80° C. and c) thereafter the condensation product is subjected to an after-treatment in a strongly alkaline range of $pH \geq 11.0$ and at an elevated temperature.

Surprisingly, we have found that, in this way, the content of free formaldehyde in the condensation products can be very considerably reduced. Furthermore, with the help of the process according to the present invention, it is possible to produce relatively highly concentrated products with good dispersing properties, which could also not have been foreseen.

A further surprising effect is to be seen in the fact that the condensates produced according to the present invention possess an excellent storage stability not only at ambient temperature but also at elevated temperatures, i.e. the viscosity thereof scarcely changes and they retain their dispersing action even after a comparatively long storage time.

In the process according to the present invention, in the first step the components amino-s-triazine, formaldehyde and sulphite are condensed until sulphite can practically no longer be detected by the usual methods.

According to the present invention, as amino-s-triazine with at least two amino groups there is preferably used melamine or also a guanamine, for example benzo- or acetoguanamine. Within the scope of the present invention, it is also possible to use a mixture of amino-s-triazines with aminoplast formers in which up to 50 mole % of the mixture can consist of another aminoplast former, for example urea, thiourea, dicyandiamide or guanidine (salts).

The formaldehyde is preferably used in the form of a 30% or also higher percentage aqueous formalin solution or as paraformaldehyde.

For the modification of the condensation products according to the present invention, as compounds introducing sulphonic acid groups there are used conventional sulphite derivatives, the alkali metal and alkaline earth metal sulphites generally being regarded as being preferable. However, bisulphites or pyrosulphites can also be used.

The mole ratio of amino-s-triazine:formaldehyde: sulphite is 1:1.3 to 6:0.3 to 1.5 in order to display, on the one hand, a still sufficient dispersing action and, on the other hand, a low content of free formaldehyde. The mole ratio of amino-s-triazine:formaldehyde: sulphite is preferably 1:2.0 to 3.0:0.8 to 1.3. When a part of the amino-s-triazine is replaced by an aminoplast former, then this participates in the mole ratio.

The condensation reaction is carried out in aqueous solution, the concentration of the reaction mixture in the aqueous solution preferably being so adjusted that the condensation product is obtained with a solids content of from 25 to 55% by weight and especially of from 40 to 50% by weight.

It is naturally also possible to work with a lower concentration if this is desirable for any reason.

The sequence of the addition of the reaction components in the first step is relatively non-problematical but, having regard to the carrying out and control of the reaction, it has proved to be especially advantageous to take the formaldehyde in aqueous solution and successively to introduce the amino-s-triazine and the sulphite components into the reaction solution.

The pH value in the first step is adjusted to a value of from 9.0 to 12.0 and preferably of from 10.5 to 11.5, which can take place with the conventional alkaline-reacting compounds or salts and especially with hydroxides. For reasons of cost, an aqueous solution of sodium hydroxide is preferably used for the adjustment of the pH value. The adjustment of the pH value can also take place in several steps.

The reaction temperature in the first step is adjusted to 50° to 90° C. in order to be able to maintain a reasonable reaction time.

After the conclusion of the first reaction step, which is normally ended after 40 to 180 minutes, in the second step the pH value is adjusted to 2.0 to 7.0 and further condensation carried out, also at a temperature of from 50° to 90° C., until the viscosity of the solution is from 4 to 1000 mm$^2$/s. at 80° C.

The acidic pH value in the second step, which is preferably from 3.0 to 6.5, is adjusted with the usual acids or acid-reacting compounds or salts, inorganic mineral acids and especially sulphuric acid preferably being used for reasons of cost.

The condensation reaction is finished when the viscosity has achieved a value in the range of from 4 to 1000 mm$^2$/s. at 80° C., which can be determined with conventional viscosity measurement methods, for example with a Ubbelohde viscosimeter. As is known, the precise viscosity value of the condensation product depends upon the desired properties (dispersing action) of the product, the range of from 4 to 30 mm$^2$/s being especially preferred for the production of water reducing agents for concrete and the range of from 40 to 1000 mm$^2$/s especially for the production of water reducing agents for gypsum and anhydrite.

When the condensation product has reached the desired end viscosity in the second step, then the reaction solution is again rendered alkaline, which can take place with the same bases or basically-reacting compounds as in the first step, thus especially with a hydroxide and preferably with an aqueous solution of sodium hydroxide. It is important for the present invention that the after-treatment in the third step is carried out in a strongly alkaline range at pH$\geq$11.0 because only in this way is it possible to achieve an effective reduction of the content of excess free formaldehyde. The precise pH value or the necessary amount of alkali is essentially dependent upon the mole ratio of the reaction components. The more formaldehyde is used in relation to the amino-s-triazine and sulphite, the more hydroxide must be added. As a rule, per mole of liberatable formaldehyde which is still present after steps a) and b), there must be used at least 0.5 mole of hydroxide, for example in the form of sodium hydroxide. Instead of sodium hydroxide, there can, of course, also be used other hydroxides, for example calcium hydroxide.

The after-treatment of the condensation products in the strongly alkaline range also takes place, as in the case of the first two steps, at an elevated temperature, especially at 50° to 100° C. and preferably at 60° to 80° C. so that laborious temperature changes during the whole of the process can be avoided.

The strongly alkaline after-treatment lasts until the content of free formaldehyde no longer changes or until a definite threshold value has been reached which, as a rule, is the case after 5 to 60 minutes.

After conclusion of the condensation reaction, the reaction solution is cooled and then has a pH value of from 8 to 12 and can be used without further after-treatment, for example as a water reducing agent.

The products produced by the process according to the present invention possess, even in the case of a relatively high use of formaldehyde, a very low content of free formaldehyde which is at least <0.1% by weight and preferably <0.03% by weight, referred to the total weight of the solution.

Furthermore, the condensation products produced according to the present invention are also outstandingly storage-stable even in the case of a high concentration of solids. Depending upon the content of solid material, they can be stored without problems for at least 6 months up to 2 years at ambient temperature without any loss of quality being ascertainable.

Because of their dispersing properties, the products produced by the process according to the present invention are outstandingly suitable as additives for hydraulically hardening building material mixtures, for example mortar, cement, gypsum and the like.

The following Examples are given for the purpose of illustrating the present invention.

The Examples describe the production and properties of the condensation products produced according to the present invention. Testing of the cement flow measure took place on a cement of the type PZ 35 (Kiefersfelden) with, in each case, a dosing of 0.2% by weight of condensation product (solid material), referred to the weight of the cement.

EXAMPLE 1

A condensation product is produced with the following mole ratio:
M:F:SO$_3$
1:1.4:0.4
M=melamine; F=formaldehyde; SO$_3$ =sulphite
Production:

280 g. 30% formalin and 270 g. water are placed in a 2 litre three-necked flask equipped with a stirrer, reflux condenser and dropping funnel and adjusted with a 20% aqueous solution of sodium hydroxide to a pH value of 8.0 to 8.5. Subsequently, 252 g. melamine are introduced in the course of 20 to 30 minutes into the reaction solution before the dropwise addition of 20 g. sodium hydroxide in the form of a 20% solution over the course of 10 to 15 minutes in order to adjust the reaction solution to a pH value of 11.5. The solution is then heated to 70° to 80° C. and simultaneously 76 g. sodium pyrosulphite (Na$_2$S$_2$O$_5$) introduced into the reaction mixture in the course of 10 to 15 minutes.

As soon as sulphite is no longer detectable, the solution is adjusted to pH 7.0 with 80 g. 10% sulphuric acid and further condensed at 80° C. up to an end viscosity of 500 mm$^2$/s at 80° C.

Subsequently, the reaction mixture is rendered strongly alkaline (pH 12.5) by the addition of 25 g. sodium hydroxide (20%) and after-treated for 20 minutes at 80° C. Before cooling, the solution is diluted with 500 ml. water.

Properties:
solids content: 26.8% by weight
free formaldehyde content: <0.03%
cement flow measure: 22.2 cm. (blank value 17.8 cm.)

EXAMPLE 2

A condensation product is produced with the following mole ratio:
M:F:SO$_3$
1:2.58:1.22
M = melamine; F = formaldehyde; SO$_3$ = sulphite Production:

In the manner described in Example 1, 516 g. 30% formalin and 270 g. water are taken at a pH value of 8.0 to 8.5, subsequently 252 g. melamine are added thereto and the pH value is adjusted to 11.5 with 37 g. sodium hydroxide (20%). With simultaneous heating to 70° to 80° C., 232 g. sodium pyrosulphite are added thereto and the reaction mixture is stirred until sulphite is no longer detectable.

The pH value is then adjusted to 6.0 with 124 g. 10% sulphuric acid and further condensed at 80° C. to an end viscosity of 9 mm$^2$/s at 80° C.

Subsequent thereto, the pH value of the reaction solution is rendered strongly alkaline (pH 11.3) with 37 g. sodium hydroxide (20%) and heated for 20 minutes to 80° C. before cooling.

Properties
solids content: 43.1% by weight
free formaldehyde content: <0.01%
cement flow measure: 24.7 cm. (blank value 18.0 cm.)

EXAMPLE 3

A condensation production is produced with the following mole ratio:
M:F:SO$_3$
1:2.58:1.22
M = melamine; F = formaldehyde; SO$_3$ = sulphite Production:

In the manner described in Example 1, 516 g. 30% formalin and 270 g. water are taken at a pH value of 8.0 to 8.5, 252 g. melamine are then added thereto and the pH is adjusted to 11.7 with 47 g. sodium hydroxide (20%). Subsequently, with simultaneous heating to 70° to 80° C., 232 g. sodium pyrosulphite are added to the reaction solution, which is stirred until sulphite is no longer detectable.

Subsequently, the pH value is adjusted to 4.9 with 75 g. 50% sulphuric acid and the reaction mixture further condensed to an end viscosity of 150 mm$^2$/s at 80° C.

After achieving this degree of reaction, the product is after-treated with 124 g. sodium hydroxide (20%) for 40 minutes at 80° C. before being allowed to cool.

Properties:
solids content: 46.1% by weight
free formaldehyde content: <0.02%
cement flow measure: 21.8 cm. (blank value 18.2 cm.)

EXAMPLE 4

A condensation product is produced with the following mole ratio:
M:F:SO$_3$
1:5.56:1.22
M = melamine; F = formaldehyde; SO$_3$ = sulphite Production:

In the manner described in Example 1, 556 g. 30% formalin and 100 g. water are taken at a pH value of 8.0 to 8.5, subsequently 126 g. melamine are introduced into the reaction solution and adjusted to pH 10.9 with 17 g. sodium hydroxide (20%).

Subsequently, with simultaneous heating to 70° to 80° C., 115 g. sodium pyrosulphite are added thereto and stirring is continued until sulphite is no longer detectable.

The pH value is then adjusted to 5.3 with 37 g. 10% sulphuric acid and the reaction solution further condensed at 80° C. until an end viscosity of 8 mm$^2$/s at 80° C. has been reached.

Subsequently thereto, the reaction solution is after-treated with 370 g. sodium hydroxide (20%) for 180 minutes at 80° C. before the product is allowed to cool.

Properties:
solids content: 34.4% by weight
free formaldehyde content: <0.02%
cement flow measure: 22.8 cm. (blank value 17.9 cm.)

EXAMPLE 5

A condensation product is produced with the following mole ratio:
M:F:SO$_3$
1:2.0:1.0
M = melamine; F = formaldehyde; SO$_3$ = sulphite Production:

In the manner described in Example 1, 400 g. 30% formalin and 247 g. water are taken at a pH value of 8.0 to 8.5, 252 g. melamine are introduced and the pH value is adjusted to 11.9 with 41 g. sodium hydroxide (20%).

There subsequently follows the addition of 190 g. sodium pyrosulphite with simultaneous heating to 70° to 80° C.

When sulphite is no longer detectable, the pH value is adjusted to 5.5 with 10% sulphuric acid and the reaction mixture further condensed at 80° C. until an end viscosity of 6 mm$^2$/s at 80° C. has been reached.

Subsequently, there follows, with the help of 60 g. sodium hydroxide (20%), a 5 minute after-treatment at 80° C. in a strongly alkaline medium (pH 11.3) before the product is cooled.

Properties:
solids content: 40.1% by weight
free formaldehyde content: <0.01%
cement flow measure: 22.5 cm. (blank value 18.1 cm.).

We claim:

1. The method of preparing a sulfonic acid groups-containing condensation product based on an amino-s-triazine with at least two amino groups and formaldehyde, said condensation product having a free formaldehyde content of less than 0.1% by weight, which consists of a) condensing an amino-s-triazine, formaldehyde and sulfite in a mol ratio of 1:1.3 to 6:0.3 to 1.5 in aqueous solution at a pH of 9.0 to 12.0 and at a temperature of 50° to 90° C. until sulfite is no longer detectable, b) subsequently continuing the condensation at a pH of 2.0 to 7.0 and at a temperature of 50° to 90° C. until the viscosity of the solution is 4 to 1000 mm$^2$/s at 80° C., and c) adjusting the solution obtained in step b) to a pH higher than 11.0 and simultaneously heating the solution at 50° to 100° C. until the content of free formaldehyde no longer changes.

2. The method of claim 1 wherein melamine is used as the amino-s-triazine.

3. The method of claim 1, wherein the mol ratio of amino-s-triazine:formaldehyde:sulphite is 1:2.0 to 3.0:0.8 to 1.3.

4. The method of claim 1, wherein the concentration of the reaction components in the aqueous solution is so adjusted that the condensation product is obtained with a solids content of 25 to 55% by weight.

5. The method of claim 4, wherein the concentration of the reaction components in the aqueous solution is so adjusted that the condensation product is obtained with a solids content of 40 to 50% by weight.

6. The method of claim 1, wherein the pH in step a) is 10.5 to 11.5.

7. The method of claim 1, wherein the pH in step b) is 3.0 to 6.5.

8. The method of claim 1, wherein the pH is adjusted in step c) with an aqueous solution of sodium hydroxide.

9. The method of claim 8, wherein per mol of formaldehyde which can still be liberated after steps a) and b), at least 0.2 mol of sodium hydroxide is used.

10. The method of claim 1, wherein the temperature in step c) is 60° to 80° C.

* * * * *